United States Patent
Mazurek

(10) Patent No.: US 12,348,430 B2
(45) Date of Patent: Jul. 1, 2025

(54) METHOD AND PROCEDURE FOR REAL TIME DETERMINATION OF MINIMUM FIBRE CHANNEL BUFFER TO BUFFER CREDITS ON AN INTER SWITCH LINK

(71) Applicant: Cisco Technology, Inc., San Jose, CA (US)

(72) Inventor: Edward Dana Mazurek, Mebane, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 363 days.

(21) Appl. No.: 17/875,930

(22) Filed: Jul. 28, 2022

(65) Prior Publication Data
US 2024/0039861 A1  Feb. 1, 2024

(51) Int. Cl.
*H04L 47/10* (2022.01)
*H04L 43/0864* (2022.01)
*H04L 43/106* (2022.01)
*H04L 47/30* (2022.01)

(52) U.S. Cl.
CPC .......... *H04L 47/39* (2013.01); *H04L 43/0864* (2013.01); *H04L 43/106* (2013.01); *H04L 47/30* (2013.01)

(58) Field of Classification Search
CPC .......................... H04L 43/0864; H04L 43/106
See application file for complete search history.

(56) References Cited

U.S. PATENT DOCUMENTS

| | | | |
|---|---|---|---|
| 7,600,035 B2 * | 10/2009 | Lalsangi | H04L 47/39 709/224 |
| 9,929,829 B1 * | 3/2018 | Huang | H04L 47/263 |
| 10,069,871 B2 * | 9/2018 | Jing | H04L 65/1069 |
| 2004/0153566 A1 | 8/2004 | Lalsangi et al. | |
| 2008/0089336 A1 | 4/2008 | Mercier et al. | |
| 2014/0204957 A1 | 7/2014 | Kanda et al. | |
| 2015/0288570 A1 * | 10/2015 | Astigarraga | G06F 13/4221 703/21 |
| 2017/0223062 A1 | 8/2017 | Jing et al. | |
| 2018/0063004 A1 | 3/2018 | Uppunda et al. | |
| 2019/0386906 A1 | 12/2019 | Bharadwaj | |
| 2022/0052968 A1 | 2/2022 | Catalano et al. | |

OTHER PUBLICATIONS

International Search Report and Written Opinion for International Application No. PCT/US2023/028006, mailed Oct. 24, 2023, 11 Pages.

(Continued)

*Primary Examiner* — Nazia Naoreen
(74) *Attorney, Agent, or Firm* — Baker Botts L.L.P.

(57) ABSTRACT

A method for the real time determination of minimum fibre channel buffer to buffer credits on an inter switch link. In one particular embodiment, a method includes communicating a first frame to a receiving switch with a first timestamp, receiving a second frame with a second and third timestamp, adding a fourth timestamp to the second frame, calculating the round trip link latency time value using the first timestamp, the second timestamp, the third timestamp, and the fourth timestamp, and calculating the minimum number of buffer to buffer credits to be configured on the link to nondisruptively transmit traffic.

17 Claims, 5 Drawing Sheets

(56) References Cited

OTHER PUBLICATIONS

Fibre Channel, Flylib.com, 31 pages, https://flylib.com/books/en/2.695.1.51/1/.
Fibre Channel Link Services (FC-LS-4), INCITS 553-20xx Link Services—4 Rev 4.03, Dec. 20, 2018, 236 pages.
FC-LS-5, Fabric Notifications Is There Anybody Out There? Authors Howard L. Johnson (Broadcom), T11-2019-00017-v000, 13 pages.
Cisco MDS 9000 Series NX-OS System Management Configuration Guide, Chapter: Configuring Interswitch Link Diagnostics, 16 pages.

* cited by examiner

|        | 8 Gbps | 16 Gbps | 32 Gbps | 64 Gbps |
|--------|--------|---------|---------|---------|
| 1 Km   | 4      | 8       | 16      | 32      |
| 10 Km  | 40     | 80      | 160     | 320     |
| 100 Km | 400    | 800     | 1600    | 3200    |

FIG. 2

METHOD AND PROCEDURE FOR REAL TIME DETERMINATION OF MINIMUM FIBRE CHANNEL BUFFER TO BUFFER CREDITS ON AN INTER SWITCH LINK

TECHNICAL FIELD

The present disclosure relates generally to fibre-channel (FC) storage area networks (SANs), including, but not limited to, a method and procedure for real time determination of minimum fibre channel buffer to buffer credits (B2B Credits) on an inter switch link.

BACKGROUND

In FC SANs, traffic through switches and Inter Switch Links (ISLs) can be slowed or impacted for a variety of reasons. FC frames may only be transmitted when the network device transmitting the frame knows that the receiving device has a buffer available to hold that FC frame. When there are not sufficient B2B Credits on each side of the link, transmission may not be able to achieve full link utilization, and congestion or slow drain may occur. The latency of an individual ISL may be measured to improve data transmission efficiency in the FC SAN. Conventional approaches must take the ISL down so that it is inoperable for a period of time in order to measure the ISL's latency.

BRIEF DESCRIPTION OF THE DRAWINGS

FIG. 2 illustrates generally accepted minimum values for certain speeds and distances, in accordance with certain embodiments.

DESCRIPTION OF EXAMPLE EMBODIMENTS

Overview

According to an embodiment, a method includes communicating frames between an initiating switch and a receiving switch, adding timestamps to the frames representing times the frames were transmitted or received at certain switches, calculating the round trip link latency time, and calculating the minimum number of buffer to buffer credits (B2B Credits) that need to be configured on the link as to minimize congestion.

According to another embodiment, a system includes one or more processors and one or more computer-readable non-transitory storage media to the one or more processors. The one or more computer-readable non-transitory storage media include instructions that, when executed by the one or more processors, cause the system to perform operations including communicating frames between an initiating switch and a receiving switch, adding timestamps to the frames representing times the frames were transmitted or received at certain switches, calculating the round trip link latency time, and calculating the minimum number of B2B Credits that need to be configured on the link as to minimize congestion.

According to yet another embodiment, one or more computer-readable non-transitory storage media embody instructions that, when executed by a processor, cause the processor to perform operations including communicating frames between an initiating switch and a receiving switch, adding timestamps to the frames representing times the frames were transmitted or received at certain switches, calculating the round trip link latency time, and calculating the minimum number of B2B Credits that need to be configured on the link as to minimize congestion.

Technical advantages of certain embodiments of this disclosure may include one or more of the following. Certain systems and methods described herein conserve networking resources that are expended when congestion occurs in conventional systems and methods. The systems and methods described herein may detect links that may be impacted by congestion without taking the link(s) out of service as required by current systems and methods. Further, the systems and methods described herein improve transmission time by reducing congestion that slows transmission of data through the ISLs. The technical advantages of certain embodiments of this disclosure are especially apparent in long-distance link topologies where congestion may be compounded by transmission times longer than those experienced across links of a shorter distance.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 1:
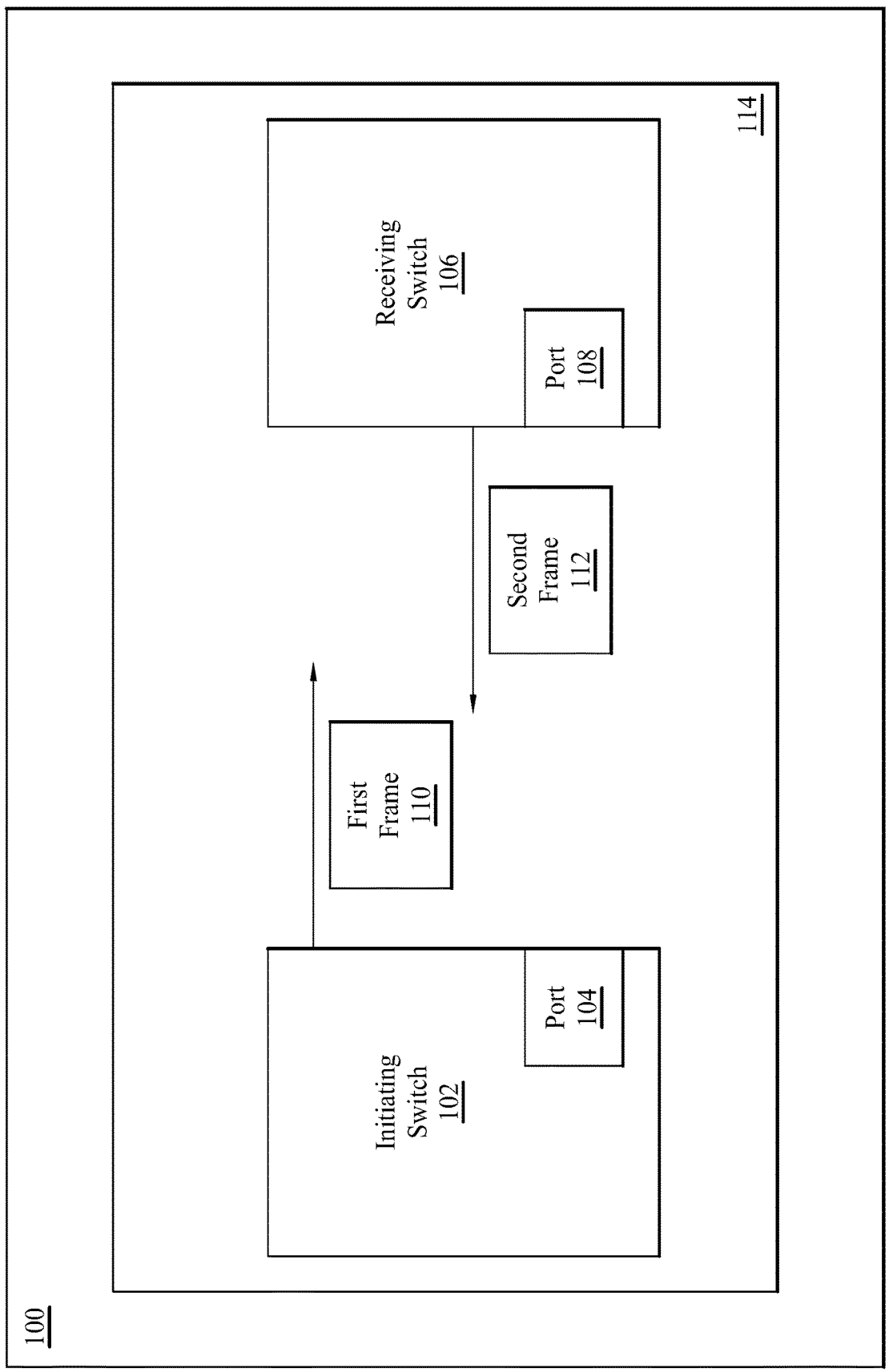
FIG. 1 illustrates a system for determining a minimum number of B2B Credits that will nondisruptively run on an ISL, in accordance with certain embodiments.
Figure 3:
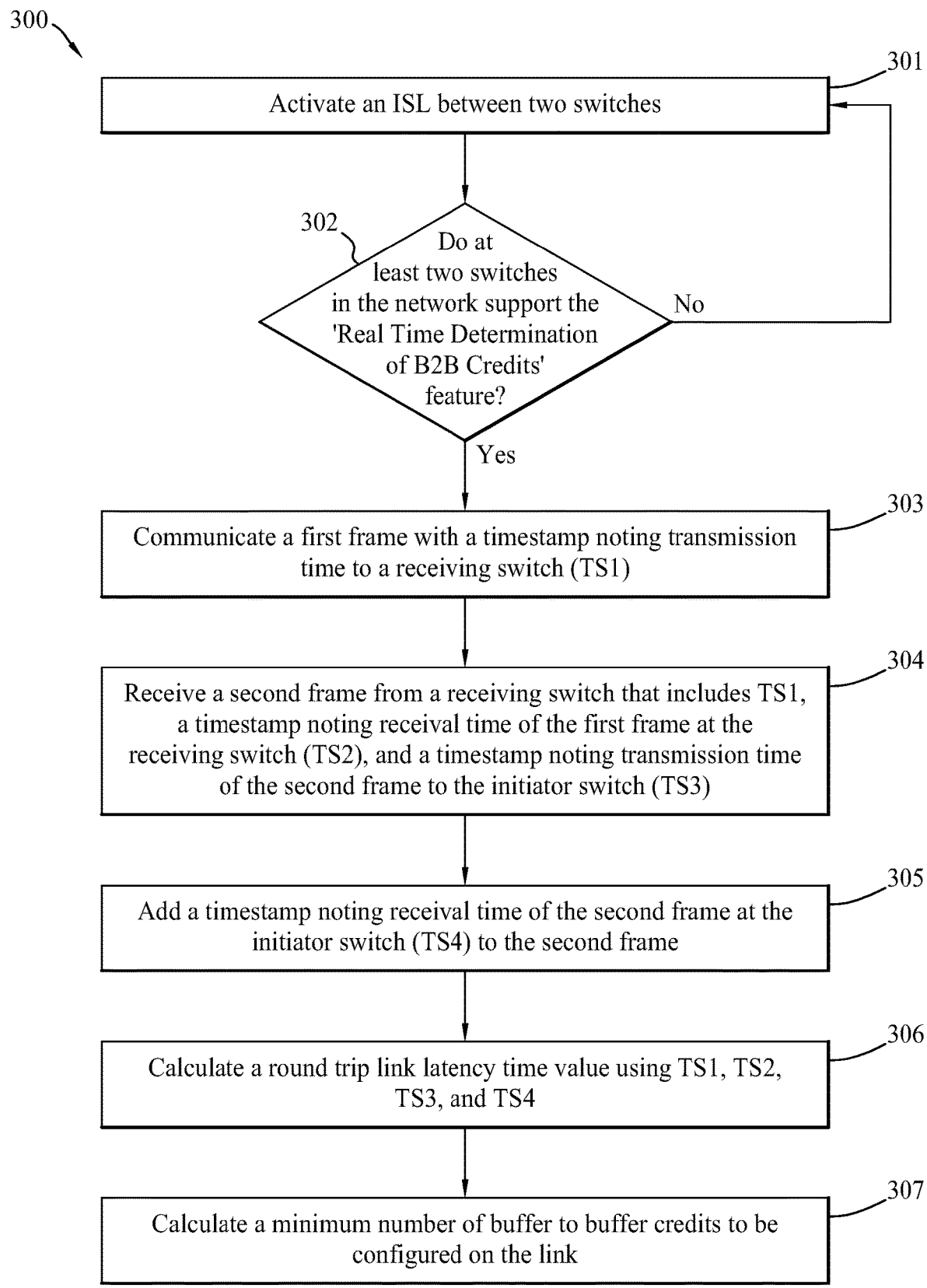
FIG. 3 illustrates a method for determining a minimum number of B2B Credits that will nondisruptively run on an ISL using an initiating switch, in accordance with certain embodiments.
Figure 4:
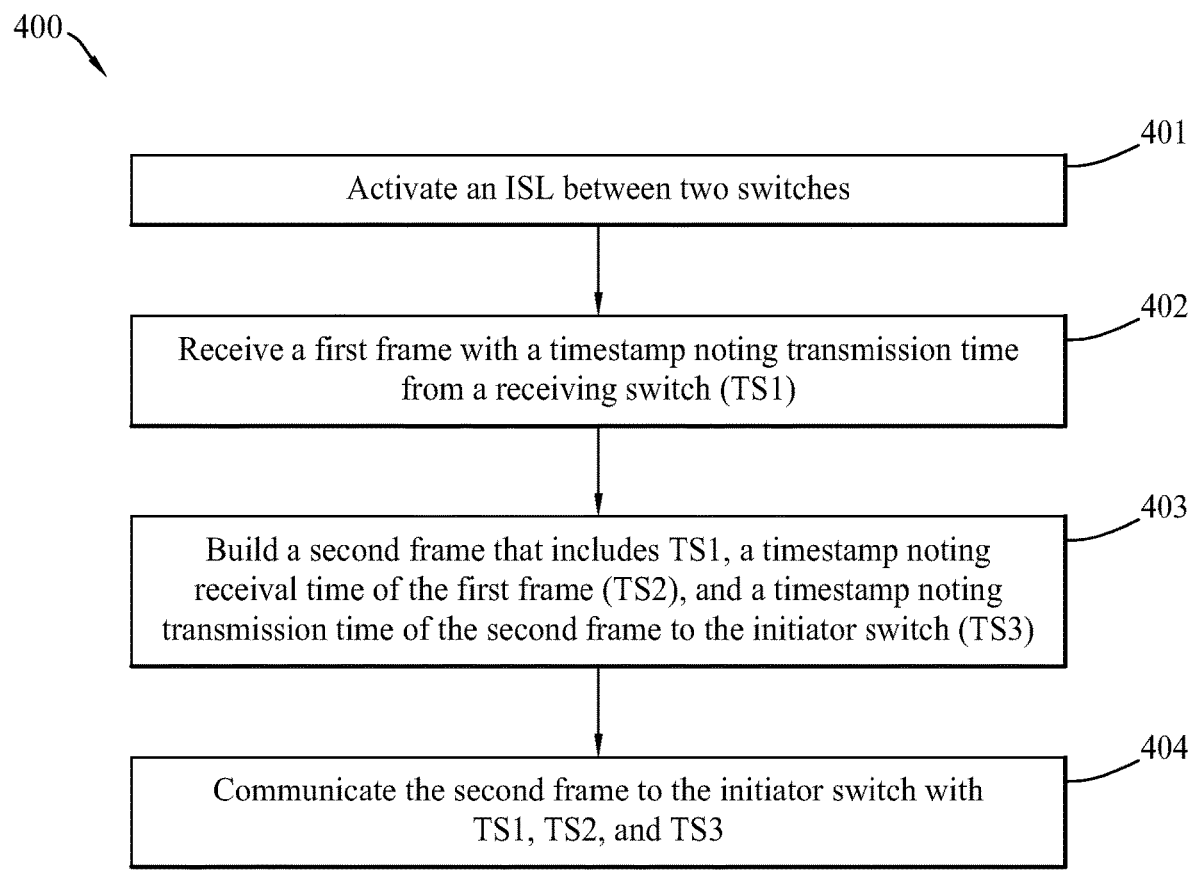
FIG. 4 illustrates a method for determining a minimum number of B2B Credits that will nondisruptively run on an ISL using a receiving switch, in accordance with certain embodiments.
Figure 5:
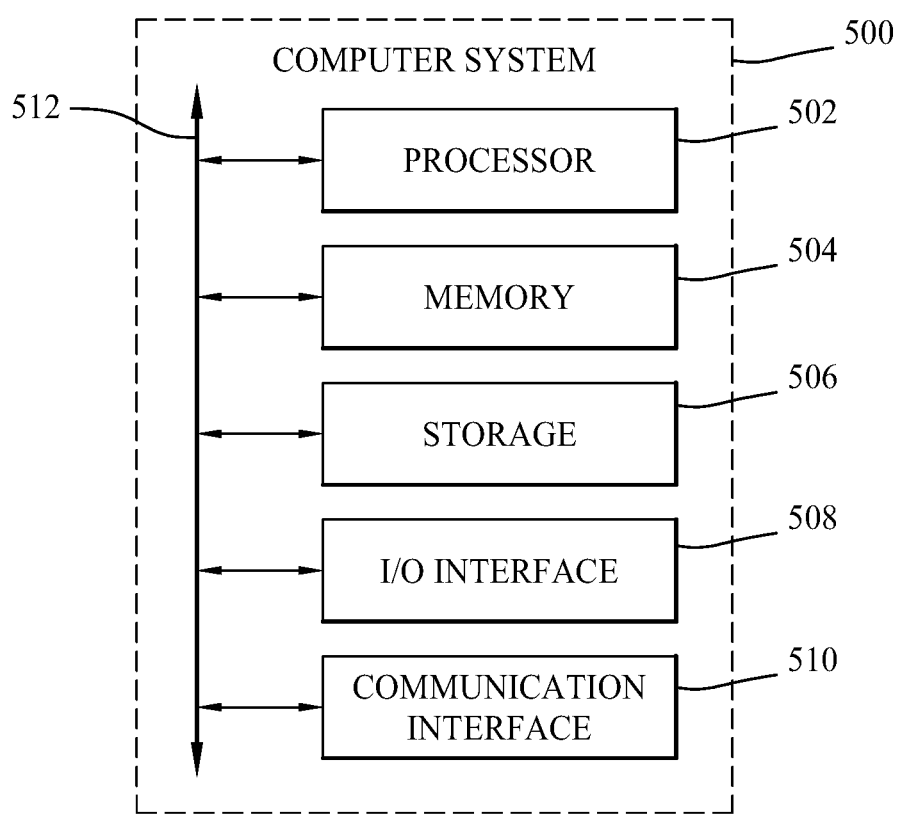
FIG. 5 illustrates an example of a computer system, in accordance with certain embodiments.

This disclosure describes systems and methods for determining a minimum number of FC Buffer to Buffer credits (B2B Credits) needed on an ISL in real-time. FIG. 1 illustrates a system for determining a minimum number of B2B Credits that will nondisruptively run on an ISL, in accordance with certain embodiments. FIG. 2 illustrates generally accepted minimum values for certain speeds and distances, in accordance with certain embodiments. FIG. 3 illustrates a method for determining a minimum number of B2B Credits that will nondisruptively run on an ISL using an initiating switch, in accordance with certain embodiments. FIG. 4 illustrates a method for determining a minimum number of B2B Credits that will nondisruptively run on an ISL using a receiving switch, in accordance with certain embodiments. FIG. 5 illustrates an example of a computer system, in accordance with certain embodiments.

FIG. 1 is a block diagram illustrating an example system 100, according to particular embodiments. System 100 or portions thereof may be associated with an entity, which may include any entity, such as a business or company (e.g., a service provider) that uses Fibre Channel or SAN infrastructure to transmit data or frames. The components of system 100 may include any suitable combination of hardware, firmware, and software. For example, the components of system 100 may use one or more elements of the computer system of FIG. 5. In the illustrated embodiment depicted in FIG. 1, system 100 includes initiating switch 102, initiating switch port 104, receiving switch 106, receiver switch port 108, first frame 110, second frame 112, and network 114.

Initiating switch 102 represents a networking device that is compatible with FC protocol and initiates and/or receives data transmission in a SAN. Initiating switch 102 may include any suitable network device that facilitates FC data transmission in a SAN. In one embodiment, initiating switch 102 may be a Cisco FC switch or switching module. Initiating switch 102 may also be a modular director switch, a backbone switch, or an edge switch. Initiating switch 102 may include a processor, memory, storage, and interface. In certain embodiments, initiating switch 102 may provide functionality for monitoring and managing storage networking. Receiving switch 106 also represents a networking device that is compatible with FC protocol and initiates and/or receives data transmission in a SAN. Receiving switch 106 may include any suitable network device that facilitates FC data transmission in a SAN. In one embodiment, receiving switch 106 may be a Cisco FC switch or switching module. Receiving switch 106 may also be a modular director switch, a backbone switch, or an edge switch. Receiving switch 106 may include a processor, memory, storage, and interface. In certain embodiments, Receiving switch 106 may provide functionality for monitoring and managing storage networking. Any switch in network 114 may be a receiving switch 106 and/or an initiating switch 102. Devices in network 114 may be initiating switches 102 in certain contexts and receiving switches 106 in other contexts. Devices may repeatedly change if they act as an initiating switch 102 or a receiving switch 106 depending on the trafficking and/or transmission of data and information occurring within network 114.

Initiating switch port 104 and receiver switch port 108 of system 100 both represent hardware pathways into and out of a particular network device that performs data communication over an FC link. Initiating switch port 104 is a hardware pathway into and out of initiating switch 102. Receiver switch port 108 is a hardware pathway into and out of receiving switch 106. Initiating switch port 104 and receiver switch port 108 may be configured in any suitable manner, including as a VF Port, a VE port, a VNP port, an E port, an F port, or an SD port. Initiating switch port 104 and receiver switch port 108 may be configured to operate in any suitable mode that allows for frame transmission and/or receival, including E mode, TE mode, F mode, TF mode, TNP mode, SD mode, and Auto mode.

First frame 110 and second frame 112 both represent frames, which are protocol data units relating to the data link layer in a layer two network. These frames may have both a header and a trailer containing data and information that is transmitted with the frame across network 114. First frame 110 and second frame 112 may be any suitable frame type, including management frames, beacon frames, probe request frames, probe response frames, association request frames, association response frames, authentication request frames, authentication response frames, deauthentication frames, reassociation request frames, reassociation response frames, announcement traffic indication message frames, and any other suitable configuration of frame. In certain embodiments, first frame 110 may be a "Real Time Determination of B2B Credits" command frame and second frame 112 may be a "Real Time Determination of B2B Credits" response frame.

Network 114 represents a fibre channel fabric that may include a number of network entities such as switches 102 and 106 as well as a generic service provider, which may be yet another switch. The fibre channel architecture shown in FIG. 1 is a switch-based architecture. However, it should be noted that fibre channel networks may be implemented using a variety of different topologies such as arbitrated loop and point-to-point. The fibre channel network 114 may be connected to a conventional IP network through a device such as a fibre channel to IP gateway.

In an exemplary embodiment of operation, the initiating switch 102 may communicate a first frame 110 to a receiving switch 106. The first frame 110 may include timestamps representing when the first frame 110 was transmitted from the initiating switch 102 and when it was received by the receiving switch 106. The initiating switch 102 may then receive a second frame 112 that contains a timestamp representing when the second frame 112 was transmitted to the initiating switch 102 as well as the timestamps representing when the first frame 110 was transmitted from the initiating switch 102 and when the first frame 110 was received by the receiving switch 106. The initiating switch 102 may then add a fourth timestamp to the second frame 112 that represents when the second frame 112 was received at the initiating switch 102. From these timestamps, the round trip latency time for the link may be calculated. With the round trip latency time for the link, the minimum number of B2B Credits that need to be configured on the link to non-disruptively run may be calculated.

In certain embodiments, the method may further include storing data on frames, including the first frame 110 and the second frame 112, including the current number of frames transmitted and the current number of bytes transmitted to calculate the round trip link latency time in a metric unit that corresponds to distance. In these embodiments, the calculation of the minimum number of B2B Credits needed to be configured on the link may depend, at least in part, on the average frame size transmitted and the average bytes transmitted on the link. In certain embodiments, these values are updated periodically. Further, in certain embodiments, the method may include communicating a notification to a user when the calculated minimum number of B2B Credits exceeds the current number of B2B Credits configured on the link.

Although FIG. 1 illustrates a particular number of initiating switches 102, initiating switch ports 104, receiving switches 106, receiver switch ports 108, first frames 110, second frames 112, and networks 114, this disclosure contemplates any suitable number of initiating switches 102, initiating switch ports 104, receiving switches 106, receiver switch ports 108, first frames 110, second frames 112, and networks 114. Additionally, this disclosure contemplates any suitable arrangement of initiating switches 102, initiating switch ports 104, receiving switches 106, receiver switch ports 108, first frames 110, second frames 112, and networks 114. Additionally, this disclosure contemplates any suitable combination of any suitable components, devices, or systems carrying out any suitable actions.

FIG. 2 is a chart illustrating typical numbers of B2B Credits needed to transmit full size (2K) frames certain distances, i.e., 1 kilometer, 10 kilometers, and 100 kilometers, at certain speeds, i.e., 8 gigabytes per second (Gbps), 16 Gbps, 32 Gbps, and 64 Gbps. The values shown in FIG. 2 may be exemplary data points. In certain embodiments, frames to be transmitted may be sizes other than those depicted, frames may be transmitted distances other than those depicted, and frames may be transmitted at speeds other than those depicted.

Generally, in FC networks as FC frames are transmitted to a receiver, the transmitter device may track the count of available buffers. As the receiving device receives and processes a FC frame, making a buffer available, the receiving device may transmit a (B2B Credit back to the transmitter device. The transmitter device that receives the B2B Credit may accordingly adjust the count of available buffers. To avoid congestion or slow drain, the number of B2B Credits on each side of the link may need to be adjusted based on the speed of the link, the average FC frame size transmitted, and/or the distance of the link. For example, as the initiating switch 102 transmits the first frame 110 to the receiving switch 106, the initiating switch 102 may track the number of buffers available at the receiving switch 106 and decrement the count it is tracking in response to transmitting the first frame 110 to the receiving switch 106. In certain embodiments, the receiving switch 106 receives and processes the first frame 110, making a buffer available on the receiving switch 106. The receiving switch 106 may then transmit a B2B credit to the initiating switch 102 to represent the buffer availability. In response to receiving the B2B credit, the initiating switch 102 may adjust its count to reflect the available buffer at receiving switch 106. In certain embodiments, both receiving switch 106 and initiating switch 102 may independently count and track the amount of available buffers at other switches in network 114 using B2B credits.

FIG. 3 illustrates a method for determining a minimum number of B2B Credits that will nondisruptively run on an ISL using an initiating switch, in accordance with certain embodiments. Method 300 begins at step 301. At step 301, an ISL or link between switches is activated. For example, initiating switch 102 of FIG. 1 may exchange Exchange Link Parameters commands and responses with other devices in network 114, such as receiving switch 106 of FIG. 1, to activate an ISL or link between initiating switch 102 and receiving switch 106. In certain embodiments, initiating switch 102 may also be configured to support additional features and protocols. Method 300 then moves from step 301 to step 302.

At step 302 of method 300, a switch may determine if at least two switches in the network support real time determination of B2B Credits. In certain embodiments, switches may support the "Real Time Determination of B2B Credits" feature. If less than two switches in the network support this feature, then method 300 moves from step 302 to 301. If at least two switches in the network support real time determination of B2B Credits, then method 300 moves from step 302 to step 303. For example, if an ISL was activated between initiating switch 102 of FIG. 1 and another device in network 114, initiating switch 102 may then determine if at least two switches in network 114 support the real time determination of B2B Credits feature. If initiating switch 102 supports this feature, and neither receiving switch 106 nor any other switches in network 114 support this feature, then method 300 may end. In certain embodiments, method 300 may move from step 302 to 301 instead of ending and continue to check whether another ISL or link between switches has been activated. If another ISL or link is activated, then method 300 moves from step 301 to step 302. Further, for example, if another switch on the newly activated link supported the real time determination of B2B Credits, then method 300 moves from step 302 to 303.

At step 303 of method 300, a switch communicates a first frame with a timestamp noting transmission time of the first frame (TS1) to a different switch in network 114. For example, initiating switch 102 may communicate a first frame 110 to receiving switch 106. The first frame 110 may include the time that initiating switch 102 sent the first frame 110 to receiving switch 106. In certain embodiments, the first frame 110 may include in a first field the current number of frames transmitted by initiating switch 102 ("Current Number of Frames Transmitted"). In certain embodiments, the first frame 110 may include in a second field the current number of bytes transmitted by initiating switch 102 ("Current Number of Bytes Transmitted"). At periodic intervals, first frame 110 may update the Current Number of Frames Transmitted value in the first field and the Current Number of Bytes Transmitted value in the second field by moving the value stored in the first field to a third field representing the previous number of bytes transmitted by initiating switch 102 ("Previous Number of Bytes Transmitted") and moving the value stored in the second field to a fourth field representing the previous number of frames transmitted by initiating switch 102 ("Previous Number of Frames Transmitted"). Initiating switch 102 may then record the updated Current Number of Bytes Transmitted value in the first field and record the updated Current Number of Frames Transmitted value in the second field. In certain embodiments, the first frame 110 may also include a Well Known Address (WKA) destination that is specific to the real time determination of B2B Credits feature. A WKA destination is a FC identifier that is reserved for internal use of the FC fabric or FC network, it describes the services that a device, such as the initiating switch 102 or receiving switch 106, may be capable of. Method 300 then moves from step 303 to 304.

At step 304 of method 300, a switch receives a second frame from an adjacent switch within the network noting the time a first frame was received at the adjacent switch in the network (TS2) and noting the time the adjacent switch transmitted the second frame to the switch (TS3). An adjacent switch may be another switch within network 114. For example, initiating switch 102 may receive a second frame 112 from receiving switch 106. The second frame 112 may include the time that the first frame 110 was received at the receiving switch 106 from the initiating switch 102. The second frame 112 may also include the time that the receiving switch 106 transmitted the second frame 112 to initiating switch 102. In certain embodiments, the second frame 112 may also include a Well Known Address destination that is specific to the real time determination of B2B Credits feature. Method 300 then moves from step 304 to step 305.

At step 305 of method 300, a switch may add a timestamp to a frame noting the time it received the frame from another device within the network. For example, initiating switch 102 may add a timestamp to the second frame 112 noting the time that initiating switch 102 received the second frame 112 from the receiving switch 106 (TS4). Method 300 then moves from step 305 to step 306.

At step 306 of method 300, a round link latency time value may be calculated using TS1, TS2, TS3, and TS4. For example, the timestamps TS1, TS2, TS3, and TS4 on the first frame 110 and the second frame 112 may be used to determine how long it takes for a frame to travel round trip on the particular ISL between initiating switch 102 and receiving switch 106. In certain embodiments, round trip link latency time may be calculated using the difference in time between TS4 and TS1 and the difference in time between TS3 and TS2. For example, the round trip link latency time may be calculated using the following equation:

$$\text{Round trip link latency time} = (TS4 - TS1) - (TS3 - TS2).$$

In certain embodiments, (TS3−TS2) represents the amount of time the receiving switch 106 takes to process the first frame 110 and build the second frame 112. As such, the actual round trip link latency time may be determined by subtracting (TS3−TS2) from (TS4−TS1).

In certain embodiments, the round trip link latency may also be calculated in a unit of physical distance using the known value of the speed of light in fiber. For example, the round trip link latency may be calculated in the distance unit of kilometers using the following equation: Round trip link latency distance=Speed of light in fiber in kilometers per second units*round trip link latency time. Method 300 then moves from step 306 to step 307.

At step 307 of method 300, a minimum number of B2B Credits to be configured on the link to nondisruptively run on an ISL may be determined. For example, initiating switch 102 may calculate the minimum number of B2B Credits needed to be configured to nondisruptively run on the link by using the link speed, the round trip link latency distance, and the average number of bytes per frame transmitted. In certain embodiments, the minimum number of B2B Credits needed may be calculated using the following equation:

$$\text{Minimum number of } B2B \text{ Credits} = \left(\frac{\text{Link speed}}{2}\right) * \text{Round}$$
$$\text{trip link latency distance} * \left(\frac{2048}{\text{Average number of Bytes per frame transmitted}}\right).$$

The average number of bytes per frame transmitted may be calculated using the Current Number of Bytes Transmitted, Previous Number of Bytes Transmitted, Current Number of Frames Transmitted, and Current Number of Frames Transmitted. In certain embodiments, the average number of bytes per frame transmitted on an ISL may be calculated using the following equation:

Average number of bytes per frame transmitted =

$$\frac{\text{Current Number of Bytes Transmitted} - \text{Previous Number of Bytes Transmitted}}{\text{Current Number of Frames Transmitted} - \text{Previous Number of Frames Transmitted}}$$

For example, the average number of bytes per frame transmitted may be calculated by subtracting the Previous Number of Bytes Transmitted value in the third field of first frame 110 from the Current Number of Bytes Transmitted value in the first field of first frame 110 and dividing that by the value resulting from subtracting the Previous Number of Frames Transmitted value in the fourth field of first frame 110 from the Current Number of Frames Transmitted value in the second field of first frame 110. In certain embodiments, the Current Number of Bytes Transmitted value and the Current Number of Frames Transmitted value may be updated after the Average Number of Bytes per Frame Transmitted is calculated. In certain embodiments, the Current Number of Bytes Transmitted, Previous Number of Bytes Transmitted, Current Number of Frames Transmitted, and Current Number of Frames Transmitted values may be stored in the second frame 112.

Although this disclosure describes and illustrates an example method 300 for a method for determining a minimum number of B2B Credits that will nondisruptively run on an ISL including the particular steps of the method of FIG. 3, this disclosure contemplates any suitable method 300 for a method for determining a minimum number of B2B Credits that will nondisruptively run on an, including any suitable steps, which may include all, some, or none of the steps of the method of FIG. 3, where appropriate. Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates particular components, devices, or systems carrying out particular steps of method 300 of FIG. 3, this disclosure contemplates any suitable combination of any suitable components, devices, or systems carrying out any suitable steps of method 300 of FIG. 3.

FIG. 4 illustrates a method for determining a minimum number of B2B Credits that will nondisruptively run on an ISL using a receiving switch, in accordance with certain embodiments. Method 400 begins at step 401. At step 401, an ISL or link between switches is activated. For example, receiving switch 106 of FIG. 1 may exchange Exchange Link Parameters commands and responses with other devices in network 114, uch as initiating switch 102 of FIG. 1. In certain embodiments, receiving switch 106 may also be configured to support additional features and protocols. Method 400 then moves from step 401 to step 402.

At step 402 of method 400, a switch receives a first frame from an adjacent switch within the network noting the time the first frame was transmitted from the adjacent switch in the network (TS1). An adjacent switch may be any other switch in network 114. For example, receiving switch 106 may receive a first frame 110 from initiating switch 102. The first frame 110 may include the time that the first frame 110 was transmitted from the initiating switch 102 to the receiving switch 106. Method 400 then moves from step 402 to step 403.

At step 403 of method 400, a switch builds a second frame noting the time it received a first frame from an adjacent switch in the network (TS2) and noting the time it will transmit the second frame to the switch (TS3). For example, receiving switch 106 may build a second frame 112. The second frame 112 may include the time that the first frame 110 was received at the receiving switch 106 from the initiating switch 102 (TS2). The second frame 112 may also include a time that receiving switch 106 transmitted the second frame 112 to initiating switch 102 (TS3). In certain embodiments, TS3 may represent a time shortly before or after the receiving switch 106 transmits the second frame 112 to the initiating switch 102. Method 400 then moves from step 403 to step 404.

At step 404 of method 400, a switch transmits the second frame it built to another switch in the network. For example, receiving switch 106 may transmit the second frame 112 to initiating switch 102. Second frame 112 may include TS1, TS2, and TS3.

Although this disclosure describes and illustrates an example method 400 for a method for determining a minimum number of B2B Credits that will nondisruptively run on an ISL including the particular steps of the method of FIG. 4, this disclosure contemplates any suitable method 400 for a method for determining a minimum number of B2B Credits that will nondisruptively run on an, including any suitable steps, which may include all, some, or none of the steps of the method of FIG. 4, where appropriate. Although this disclosure describes and illustrates particular steps of method 400 of FIG. 4 as occurring in a particular order, this disclosure contemplates any suitable steps of method 400 of FIG. 4 occurring in any suitable order. Although this disclosure describes and illustrates particular components, devices, or systems carrying out particular steps of method 400 of FIG. 4, this disclosure contemplates any suitable combination of any suitable components, devices, or systems carrying out any suitable steps of method 400 of FIG. 4.

FIG. 5 illustrates an example of a computer system, in accordance with certain embodiments. In particular embodiments, one or more computer systems 500 provide functionality described or illustrated herein. As an example, one or more computer systems 500 may be used to provide at least a portion of system 100, initiating switch 102, initiating switch port 104, receiving switch 106, receiver switch port 108, first frame 110, second frame 112, or network 114 described with respect to FIG. 1. As another example, one or more computer systems 500 may be used to perform one or more steps described with respect to FIGS. 3 and 4. In particular embodiments, software running on one or more computer systems 500 provides functionality described or illustrated herein or performs one or more steps of one or more methods described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a PDA, a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A method, comprising:
   storing a current number of frames transmitted value in a first field of a first frame and a current number of bytes transmitted value in a second field of the first frame before transmitting the first frame to a receiving switch;
   transmitting the first frame from an initiating switch to the receiving switch, wherein the first frame comprises a first timestamp of the first frame being transmitted and a second timestamp of the first frame received at the receiving switch;
   receiving a second frame at the initiating switch, wherein the second frame comprises at least the first timestamp, the second timestamp, and a third timestamp of the second frame being transmitted to the initiating switch;
   adding a fourth timestamp to the second frame, wherein the fourth timestamp indicates when the second frame was received at the initiating switch;
   calculating a round trip link latency time value using the first timestamp, the second timestamp, the third timestamp, and the fourth timestamp; and
   calculating a minimum number of buffer to buffer credits to be configured on a link using at least the round trip link latency time value.

2. The method of claim 1, wherein the first frame further comprises a Well Known Address (WKA) destination.

3. The method of claim 1, further comprising storing the current number of frames transmitted value in a third field and the current number of bytes transmitted value in a fourth field at a periodic interval.

4. The method of claim 3, further comprising:
   calculating an average transmit frame size using at least the current number of frames transmitted value in the first field of the first frame, the current number of bytes transmitted value in the second field of the first frame, the current number of frames transmitted value in the third field of the first frame, and the current number of bytes transmitted value in the fourth field of the first frame;
   calculating the round trip link latency time value in a metric unit that corresponds to distance; and
   calculating the minimum number of buffer to buffer credits to be configured on the link using at least the average transmit frame size and the round trip link latency time value.

5. The method of claim 4, further comprising:
   updating the current number of frames transmitted value in the first field to reflect the current number of frames transmitted value in the third field; and
   updating the current number of bytes transmitted value in the second field to reflect the current number of bytes transmitted value in the third field and the fourth field;
   wherein updating the current number of frames transmitted value and updating the current number of bytes transmitted value occurs after the average transmit frame size is calculated.

6. The method of claim 1, wherein:
   the calculated minimum number of buffer to buffer credits exceeds a current number of buffer to buffer credits configured on the link; and
   the method further comprises communicating a notification to a user.

7. A system, comprising:
   one or more processors; and
   one or more computer-readable non-transitory storage media comprising instructions that, when executed by the one or more processors, cause one or more components of the system to perform operations comprising:
   storing a current number of frames transmitted value in a first field of a first frame and a current number of bytes transmitted value in a second field of the first frame before transmitting the first frame to a receiving switch;

transmitting the first frame from an initiating switch to a receiving switch, wherein the first frame comprises a first timestamp of the first frame being transmitted and a second timestamp of the first frame received at the receiving switch;

receiving a second frame at the initiating switch, wherein the second frame comprises at least the first timestamp, the second timestamp, and a third timestamp of the second frame being transmitted to the initiating switch;

adding a fourth timestamp to the second frame, wherein the fourth timestamp indicates when the second frame was received at the initiating switch;

calculating a round trip link latency time value using the first timestamp, the second timestamp, the third timestamp, and the fourth timestamp; and calculating a minimum number of buffer to buffer credits to be configured on a link using at least the round trip link latency time value.

8. The system of claim 7, wherein the first frame further comprises a Well Known Address (WKA) destination.

9. The system of claim 7, the operations further comprising storing the current number of frames transmitted value in a third field and the current number of bytes transmitted value in a fourth field at a periodic interval.

10. The system of claim 9, the operations further comprising:
calculating an average transmit frame size using at least the current number of frames transmitted value in the first field of the first frame, the current number of bytes transmitted value in the second field of the first frame, the current number of frames transmitted value in the third field of the first frame, and the current number of bytes transmitted value in the fourth field of the first frame;
calculating the round trip link latency time value in a metric unit that corresponds to distance; and
calculating the minimum number of buffer to buffer credits to be configured on the link using at least the average transmit frame size and the round trip link latency time value.

11. The system of claim 10, the operations further comprising:
updating the current number of frames transmitted value in the first field to reflect the current number of frames transmitted value in the third field; and
updating the current number of bytes transmitted value in the second field to reflect the current number of bytes transmitted value in the third field and the fourth field;
wherein updating the current number of frames transmitted value and updating the current number of bytes transmitted value occurs after the average transmit frame size is calculated.

12. The system of claim 7, wherein:
the calculated minimum number of buffer to buffer credits exceeds a current number of buffer to buffer credits configured on the link; and
the operations further comprise communicating a notification to a user.

13. One or more computer-readable non-transitory storage media embodying instructions that, when executed by a processor, cause performance of operations comprising:
storing a current number of frames transmitted value in a first field of a first frame and a current number of bytes transmitted value in a second field of the first frame before transmitting the first frame to a receiving switch;
transmitting the first frame from an initiating switch to a receiving switch, wherein the first frame comprises a first timestamp of the first frame being transmitted and a second timestamp of the first frame received at the receiving switch;
receiving a second frame at the initiating switch, wherein the second frame comprises at least the first timestamp, the second timestamp, and a third timestamp of the second frame being transmitted to the initiating switch;
adding a fourth timestamp to the second frame, wherein the fourth timestamp indicates when the second frame was received at the initiating switch;
calculating a round trip link latency time value using the first timestamp, the second timestamp, the third timestamp, and the fourth timestamp; and
calculating a minimum number of buffer to buffer credits to be configured on a link using at least the round trip link latency time value.

14. The one or more computer-readable non-transitory storage media of claim 13, wherein the first frame further comprises a Well Known Address (WKA) destination.

15. The one or more computer-readable non-transitory storage media of claim 13, the operations further comprising storing the current number of frames transmitted value in a third field and the current number of bytes transmitted value in a fourth field at a periodic interval.

16. The one or more computer-readable non-transitory storage media of claim 15, the operations further comprising:
calculating an average transmit frame size using at least the current number of frames transmitted value in the first field of the first frame, the current number of bytes transmitted value in the second field of the first frame, the current number of frames transmitted value in the third field of the first frame, and the current number of bytes transmitted value in the fourth field of the first frame;
calculating the round trip link latency time value in a metric unit that corresponds to distance;
calculating the minimum number of buffer to buffer credits to be configured on the link using at least the average transmit frame size and the round trip link latency time value;
updating the current number of frames transmitted value in the first field to reflect the current number of frames transmitted value in the third field; and
updating the current number of bytes transmitted value in the second field to reflect the current number of bytes transmitted value in the third field and the fourth field;
wherein updating the current number of frames transmitted value and updating the current number of bytes transmitted value occurs after the average transmit frame size is calculated.

17. The one or more computer-readable non-transitory storage media of claim 16, wherein:
the calculated minimum number of buffer to buffer credits exceeds a current number of buffer to buffer credits configured on the link; and
communicating a notification to a user.

* * * * *